(12) United States Patent
Irwin

(10) Patent No.: US 8,337,138 B2
(45) Date of Patent: Dec. 25, 2012

(54) THERMOFORMED ARTICLE STACK SEGMENTING APPARATUS

(76) Inventor: Jere F. Irwin, Yakima, WA (US)

(*) Notice: Subject to any disclaimer, the term of this patent is extended or adjusted under 35 U.S.C. 154(b) by 115 days.

(21) Appl. No.: 12/257,253

(22) Filed: Oct. 23, 2008

(65) Prior Publication Data

US 2010/0104413 A1    Apr. 29, 2010

(51) Int. Cl.
| B65B 23/00 | (2006.01) |
| B65B 57/00 | (2006.01) |
| B65B 57/12 | (2006.01) |
| B65G 47/04 | (2006.01) |
| B65G 47/08 | (2006.01) |

(52) U.S. Cl. .............. 414/796; 414/795.6; 414/797.9; 414/798.9

(58) Field of Classification Search ............... 198/419.1, 198/429; 221/223, 238, 225, 236, 297, 301; 414/795.6, 796.6, 796.8, 797.4, 797.9, 798.4, 414/798.7, 798.9; 83/85
See application file for complete search history.

(56) References Cited

U.S. PATENT DOCUMENTS

| 3,313,482 | A | * | 4/1967 | Midgley et al. ............. 235/98 R |
| 3,419,186 | A | * | 12/1968 | Cease ........................... 221/221 |
| 3,491,633 | A | * | 1/1970 | White ............................... 83/23 |
| 3,497,086 | A | * | 2/1970 | Schnepp et al. ............ 414/798.4 |
| 3,582,082 | A | * | 6/1971 | Takagi et al. ................. 360/92.1 |
| 3,930,572 | A | * | 1/1976 | Fluck et al. ..................... 198/367 |
| 4,054,212 | A | * | 10/1977 | Mueller ....................... 414/795.6 |
| 4,098,392 | A | * | 7/1978 | Greene ........................ 198/419.3 |
| 4,529,101 | A | | 7/1985 | Orlowski |
| 4,867,432 | A | | 9/1989 | Matta |
| 4,921,088 | A | * | 5/1990 | Ter Horst ................... 198/418.7 |
| 5,016,420 | A | * | 5/1991 | Chiappe et al. .............. 53/138.1 |
| 5,095,684 | A | * | 3/1992 | Walker et al. .................. 53/443 |
| 5,207,351 | A | * | 5/1993 | Lesar ............................. 221/223 |
| 5,281,082 | A | * | 1/1994 | Ghilardi ...................... 414/798.9 |
| 5,893,701 | A | * | 4/1999 | Pruett ......................... 414/798.2 |
| 6,692,212 | B2 | | 2/2004 | Trautwein et al. |
| 6,971,839 | B2 | * | 12/2005 | Cerutti et al. ............... 414/798.7 |
| 2003/0082045 | A1 | * | 5/2003 | Cerutti et al. ............... 414/798.9 |
| 2006/0051195 | A1 | * | 3/2006 | Leblanc et al. ............... 414/788 |
| 2010/0104413 | A1 | * | 4/2010 | Irwin .......................... 414/795.6 |

* cited by examiner

*Primary Examiner* — Gregory Adams
(74) *Attorney, Agent, or Firm* — Wells St. John P.S.

(57) ABSTRACT

A thermoformed article stack segmenting apparatus is provided. The apparatus includes a frame, a stacked article guide channel, a forward engaging drive finger, a reciprocating actuator and a rearward engaging holding finger. The stacked article guide channel is carried by the frame and configured to receive and guide a stack of inter-nested articles exiting a female die of a thermoforming trim press. The reciprocating actuator is coupled with the finger to drive the finger forward in engagement with one separated stack of articles. The actuator also drives the finger rearward in a retractable state to separate another, successive stack of articles. The rearward engaging holding finger is supported by the frame and is configured to hold the another, successive stack while driving the forward engaging drive finger forward.

19 Claims, 18 Drawing Sheets

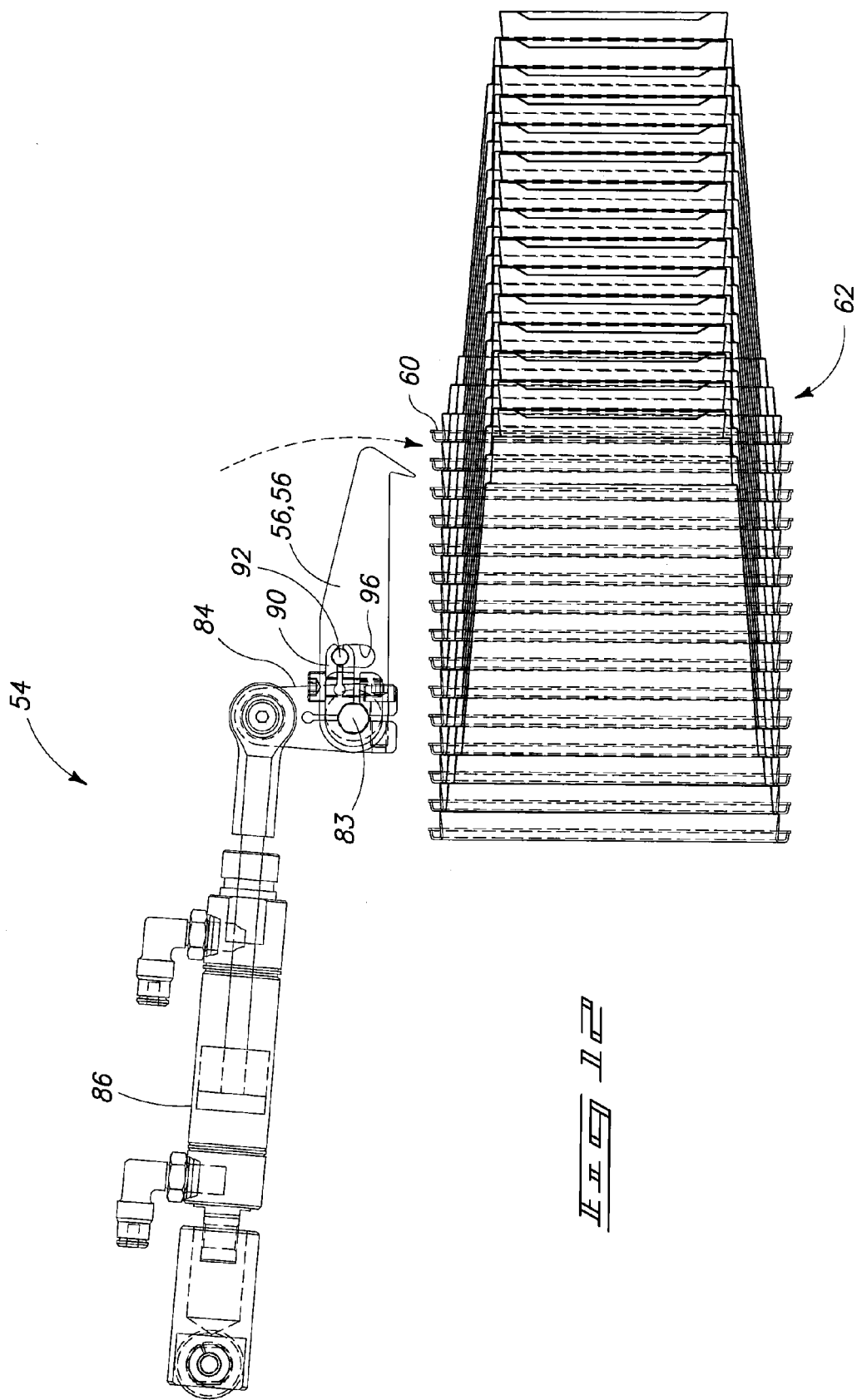

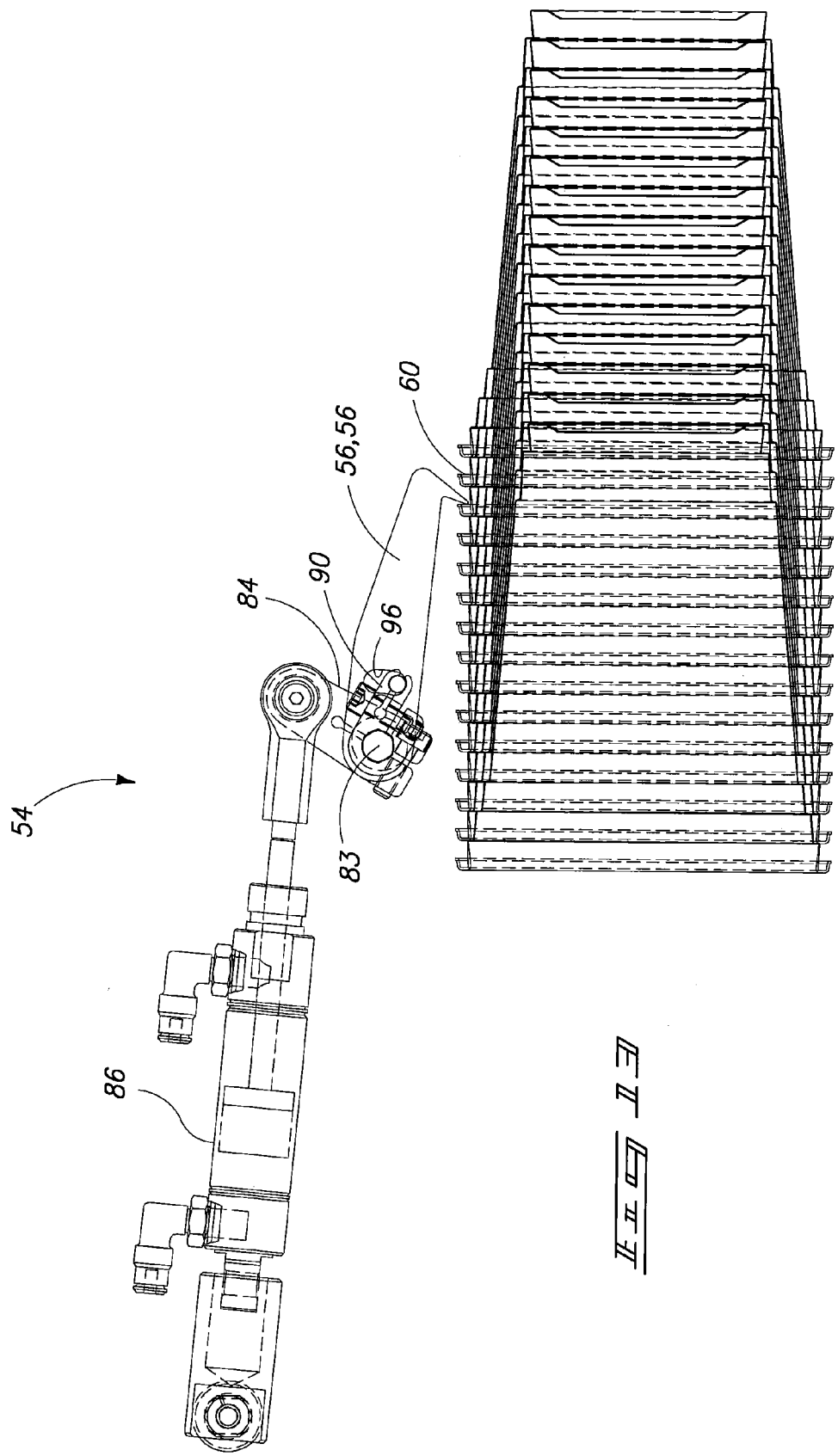

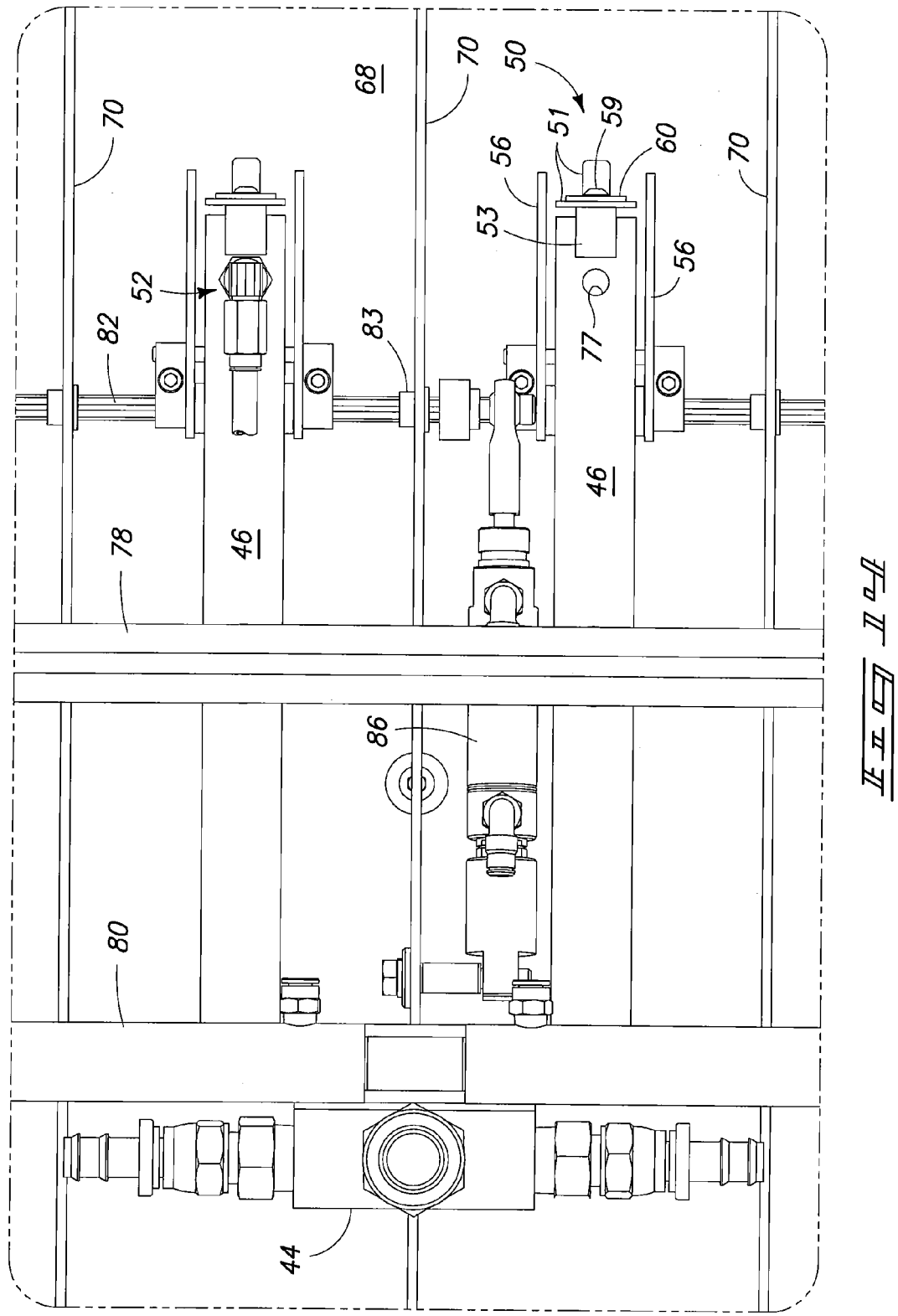

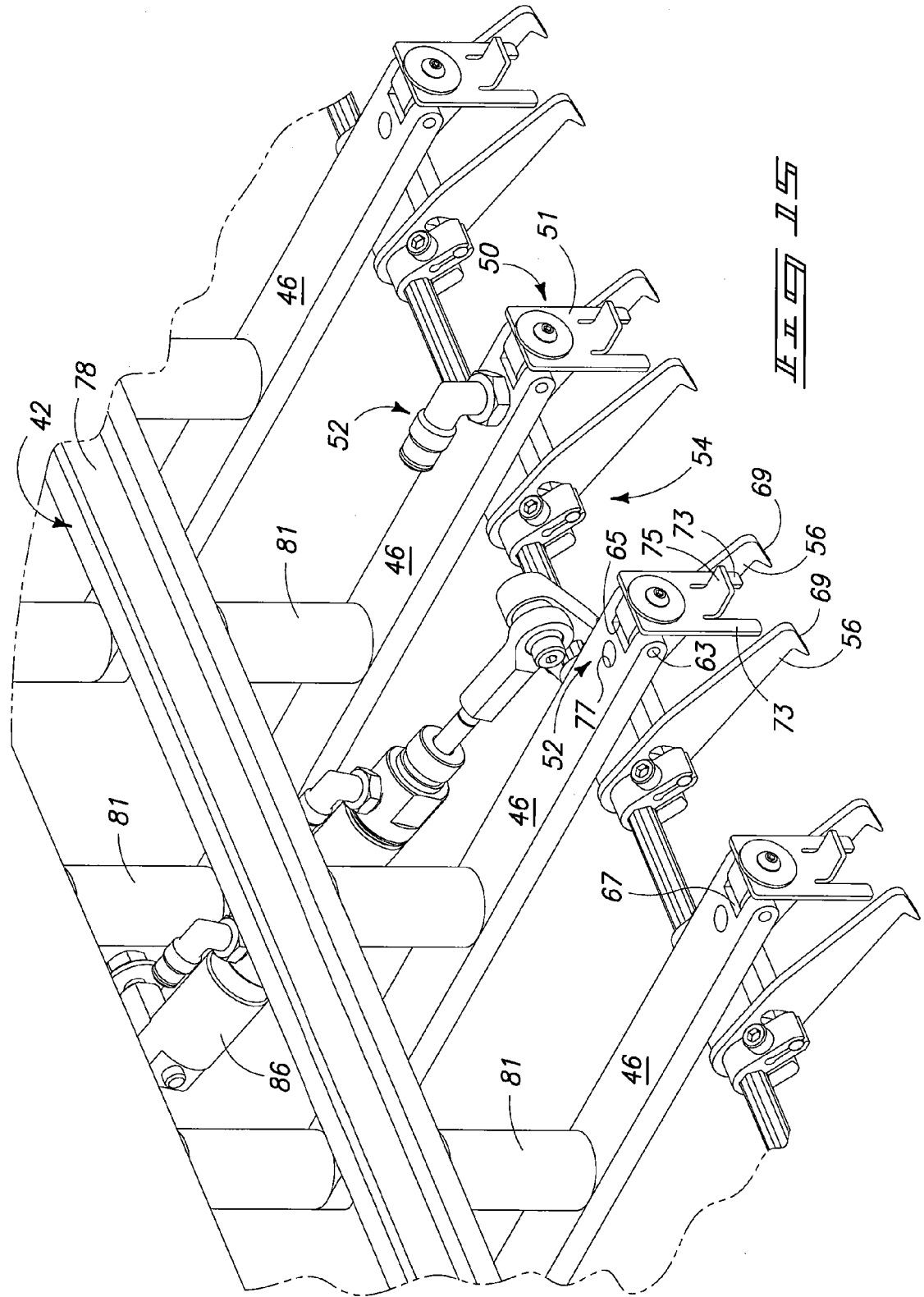

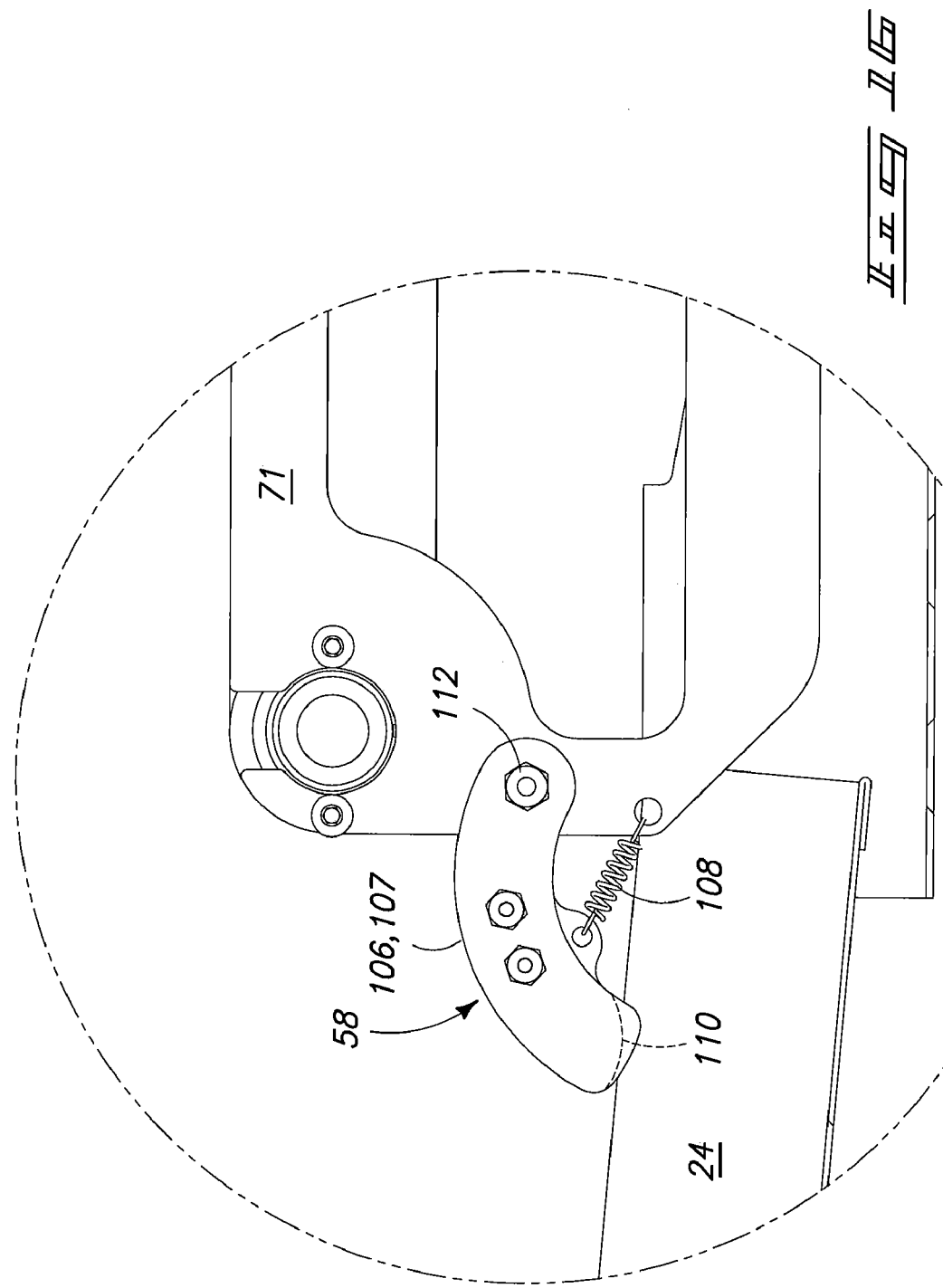

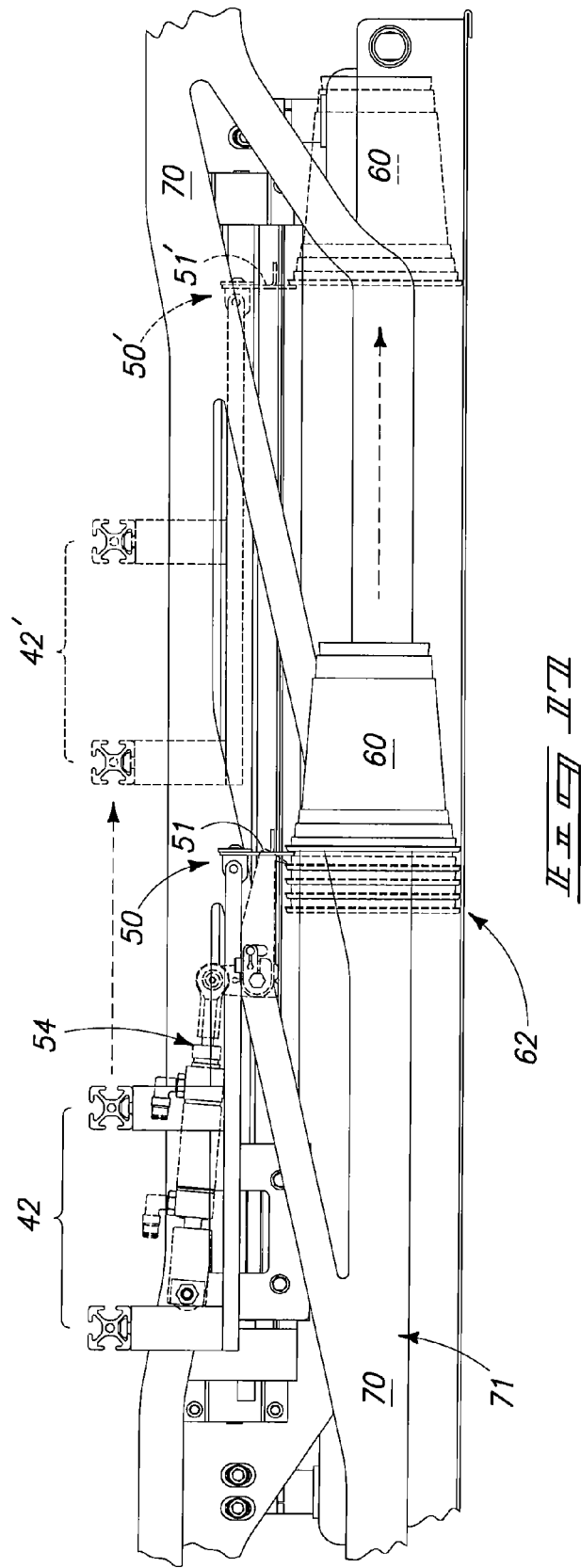

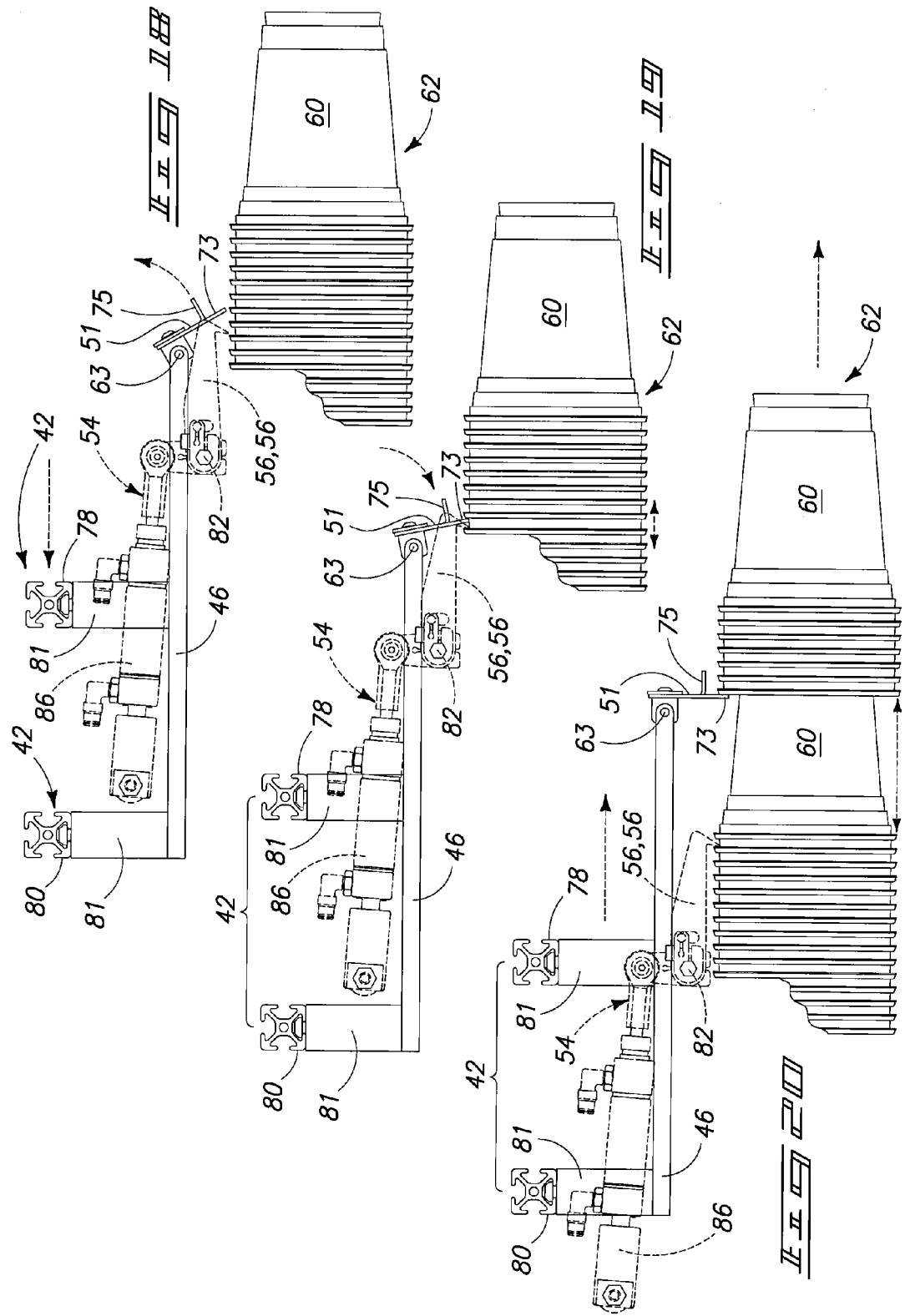

THERMOFORMED ARTICLE STACK SEGMENTING APPARATUS

TECHNICAL FIELD

This invention pertains to apparatus and methods for transferring trimmed molded articles from a thermoforming trim press for further processing and/or storage. More particularly, the present invention relates to apparatus and methods for generating segmented stacks of thermoformed articles from a continuous stack of articles leaving a trim press for further processing and/or storage.

BACKGROUND OF THE INVENTION

Apparatus and methods are known for delivering inter-nested articles from a single row of dies on a thermoforming trim press to a conveyor for further processing and packaging of stacks of the articles. Continuous stacks of inter-nested articles are delivered in a single row onto a table from the adjacent female dies of a thermoforming trim press. However, the provision of a single row of stacked articles means that the male and female cutting dies on the trim press are arranged to cut a single row of articles with each cycle. Therefore, the thermoforming trim press is required to run at a very high cycle speed. For the case of a thermoforming machine that forms eight rows of articles in a single operating cycle, a corresponding trim press has to operate eight cycles for each cycle of the thermoforming machine. Therefore, it is desirable to trim multiple rows of articles with each operating cycle of the trim press, and to separate continuous stacks into segments to facilitate handling and movement.

U.S. Pat. No. 6,692,212 illustrates one apparatus and method for stacking thermoformed containers from a molding machine. More particularly, molded and punched containers are transferred from a molding machine using stacking magazines. The articles can either be ejected directly into the stacking magazines, or they can be transferred into the stacking magazines disposed in a stacking station. However, a stack cage and a transfer device are used to shuttle accumulated containers from multiple rows of dies on a thermomolding machine to a transverse ejector. Such an apparatus and method is relatively complex, requiring multiple stack cages that interrupt the continuous stacking of containers in order to shuttle discrete stacks of containers to the transverse ejector. Furthermore, such an apparatus is difficult and time consuming to maintain if a container jambs in the stack cage during use.

Accordingly, improvements are needed in the manner that thermoformed articles are delivered in continuous sheets from a thermoforming machine to a transfer table for further processing, such as during rim rolling and packaging of cups.

SUMMARY OF THE INVENTION

An improved apparatus and method are provided for processing continuous stacks of thermoformed articles being received from a thermoforming trim press for delivery in manageable segments, or discrete stacks, to a processing table for further processing. Using an article stack segmenting apparatus, a continuous stack of thermoformed articles is segmented into discrete stacks for delivery to a conveyor table for further processing and transport.

According to one aspect, a thermoformed article stack segmenting apparatus is provided. The apparatus includes a frame, a stacked article guide channel, a forward engaging drive finger, a reciprocating actuator and a rearward engaging holding finger. The stacked article guide channel is carried by the frame and configured to receive and guide a stack of inter-nested articles exiting a female die of a thermoforming trim press. The reciprocating actuator is coupled with the finger to drive the finger forward in engagement with one separated stack of articles. The actuator also drives the finger rearward in a retractable state to separate another, successive stack of articles. The rearward engaging holding finger is supported by the frame and is configured to hold the another, successive stack while driving the forward engaging drive finger forward.

BRIEF DESCRIPTION OF THE DRAWINGS

Preferred embodiments of the invention are described below with reference to the following accompanying drawings.

FIG. 12 is a simplified component left side view of the beak rack assembly of FIGS. 9-11 showing raised pairs of beaks with a continuous stack of thermoformed cups prior to segmenting the stack with a pick assembly (not shown).

FIG. 13 is a simplified component left side view corresponding to that shown in FIG. 12 after lowering of pairs of beaks to engage with cups prior to segmenting a continuous stack of cups.

FIG. 14 is an enlarged partial plan view of a portion of the beak rack assembly and a pair of corresponding, adjacent pick assemblies.

FIG. 15 is an enlarged perspective view of the beak rack assembly and the pick assembly for four adjacent stacked article guide channels on the stack segmenting apparatus.

FIG. 16 is an enlarged view of a pivot arm assembly taken from an encircled region 16 of FIG. 5.

FIG. 17 is a simplified side view of the pick assembly and beak rack assembly for two adjacent rows, or guide channels, on the stack segmenting apparatus.

FIG. 18 is a simplified partial side view of the beak rack assembly and pick assembly while the pick assembly is being retracted in an upstream direction to begin segmentation of a new stack of cups.

FIG. 19 is a simplified partial side view taken subsequent in time to FIG. 18 of the pick assembly and beak rack assembly engaged between two adjacent cups at the initiation of a cup stack segmenting operation.

FIG. 20 is a simplified partial side view taken subsequent in time to FIG. 19 showing separation of a new segment of stacked cups via movement of the pick assembly away from the stationary beak rack assembly.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Reference will now be made to a preferred embodiment of Applicant's invention comprising an apparatus for segmenting a continuous stack of thermoformed articles, such as cups, into discrete stacks of articles. While the invention is described by way of a preferred embodiment, it is understood that the description is not intended to limit the invention to such embodiment, but is intended to cover alternatives, equivalents, and modifications which may be broader than the embodiment, but which are included within the scope of the appended claims.

In an effort to prevent obscuring the invention at hand, only details germane to implementing the invention will be described in great detail, with presently understood peripheral details being incorporated by reference, as needed, as being presently understood in the art.

Figure 1:
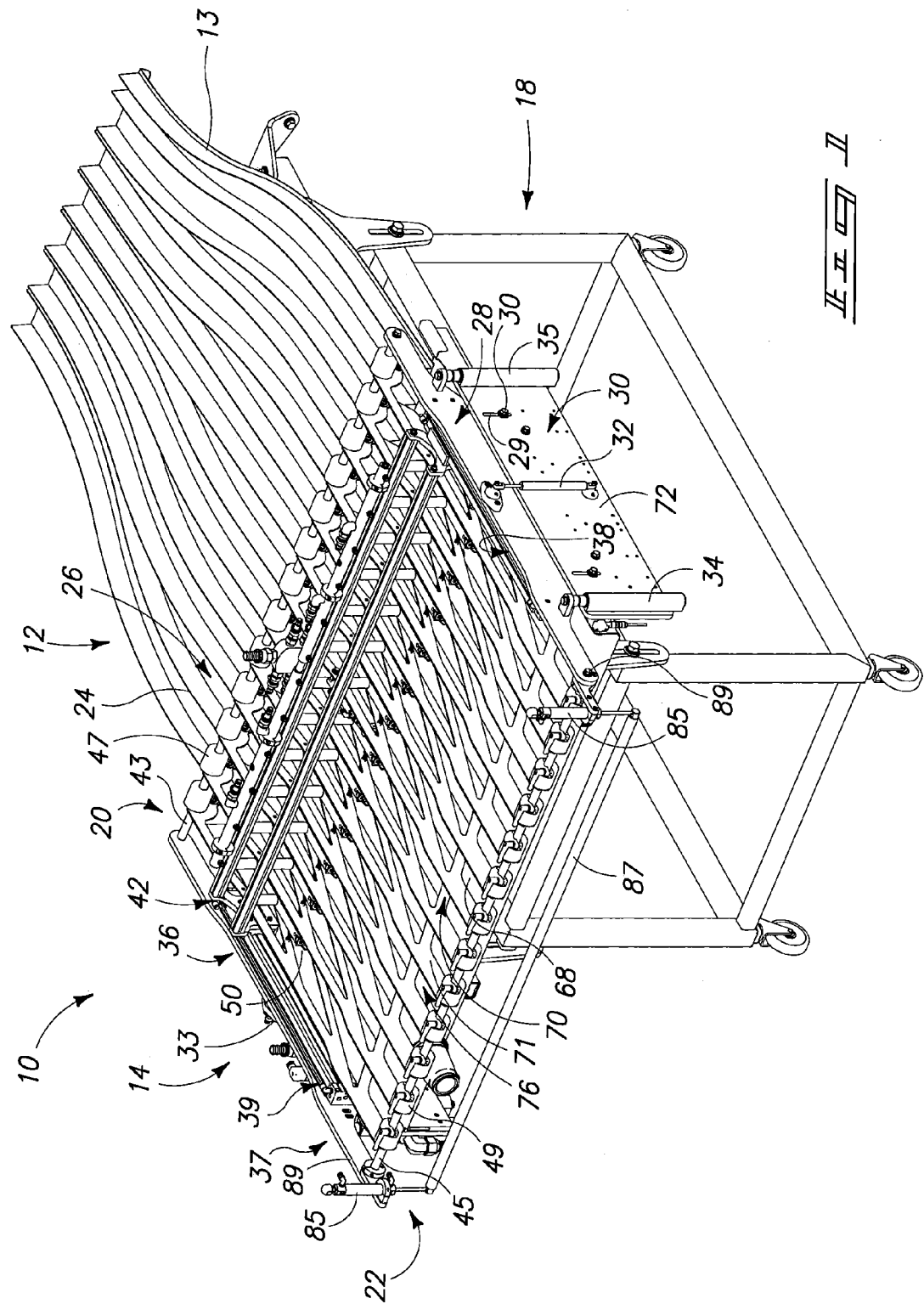
FIG. 1 is a perspective view representation of a thermoformed stack segmenting apparatus in accordance with a preferred embodiment of the invention illustrating the stack segmenting apparatus incorporated into a thermoformed article stack processing apparatus with a stack guiding apparatus and provided downstream of an article thermoforming trim press.

FIG. 1 illustrates a thermoformed article stack processing apparatus 10 that is coupled with a downstream end of a thermoforming trim press (not shown) and incorporating a stack guiding apparatus 12 and a stack segmenting apparatus 14, according to one aspect of the present invention. In addition to incorporating stack guiding apparatus 12 and stack segmenting apparatus 14, article stack processing apparatus 10 also includes a stack conveyor or accumulator 16 (see FIG. 2). Stack guiding apparatus 12 is mounted onto a frame 18 of article stack processing apparatus 10. A plurality of pivot arms and a pair of laterally spaced-apart slotted adjustment bracket assemblies enable a technician to adjust pitch and entrance height of a ramp 13 on apparatus 12 relative to a female die plate on a trim press (not shown). A downstream end of the ramp 13 merely rests on frame 18 of apparatus 10, and pivot arms 58 (see FIGS. 2, 8 and 16) grip individual baffles 20 on ramp 13. Arms 58 also pivot as ramp 13 is adjusted to a desired pitch. Each arm 58 has an end slot that interfits over a respective baffle 20 on ramp 13. Stack segmenting apparatus 14 is also mounted onto frame 22. Ramp 13 is adjusted to a desirable elevational position relative to a female die plate on a thermoforming trim press using bolts that tighten within slots on a bracket joining to frame 18. Likewise, frame 18 is rigidly fastened onto a trim press using threaded fasteners (not shown).

Stack processing apparatus 10 delivers a continuous flow of stacked cups from a trim press through stack guiding apparatus 12 where such continuous flow of stacked cups are segmented via stack segmenting apparatus 14 and delivered and stored onto a stack accumulator, or conveyor table 16 (see FIG. 2) where they are conveyed for further delivery, processing and/or packaging.

Figure 2:
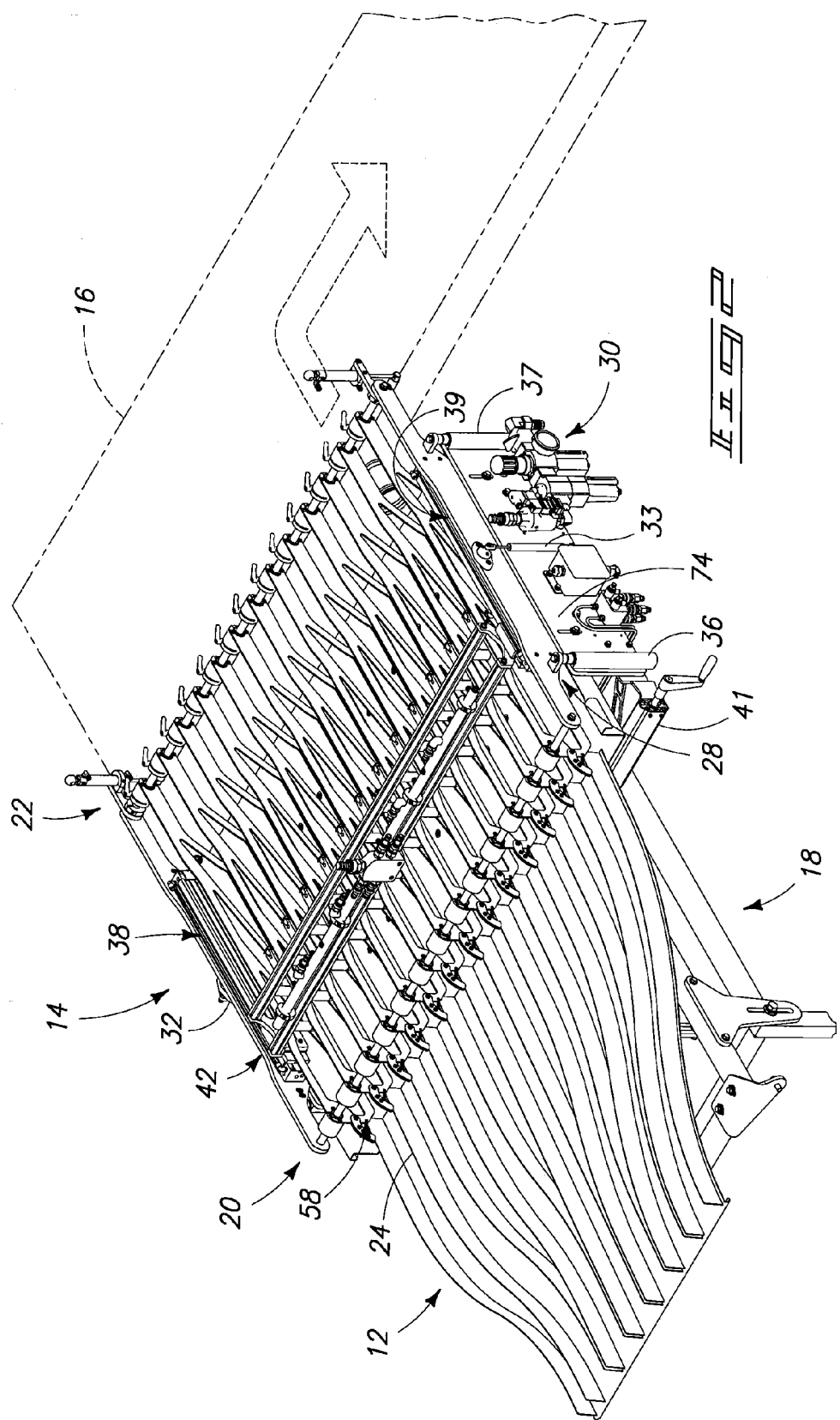
FIG. 2 is an alternative perspective view taken from an opposite direction of the apparatus depicted in FIG. 1 and further illustrating the article stack segmenting apparatus in relation to a segmented stack conveyor table.

As shown in FIG. 1, stack segmenting apparatus 14 includes an upper tray assembly 28 that is hydraulically supported atop a support base 30 via four hydraulic cylinders 34-37 at a vertically adjustable position using a hydraulic hand pump 41 (see FIG. 2). Tray assembly 28 has a bottom wall 68, side walls 64 and 66, and a plurality of divider assemblies 70 that define a plurality of longitudinally extending article, or cup channels 76. A pair of gas springs 32, 33 urge tray assembly 28 downwardly toward base 30 which helps bias tray assembly 28 towards base 30 when hydraulic fluid is withdrawn from cylinders 34-37 during hand adjustment via hydraulic hand pump 41 (of FIG. 2).

Each divider assembly 70 includes a longitudinally extending divider plate 71 that cooperates with an adjacent plate 71 or a side wall 64, 66 to define a respective channel 76. A shuttle frame 42 is supported for movement by a pair of rodless cylinders 38, 39 along inside surfaces of end walls 64 and 66, respectively. Shuttle frame 42 supports components that separate continuous stacks of articles, or cups, that are progressively pushed through respective channels 76 from an output die of a thermoforming trim press (not shown), as delivered via stack guiding apparatus 12.

Support base 30 is mounted atop a frame 18 and includes a pair of side plates 72 and 74 (see FIG. 2). Hydraulic cylinders 34, 35 and gas spring 32 are mounted onto plate 72, whereas hydraulic cylinders 36, 37 and gas spring 33 are mounted onto plate 74. Opposite ends of cylinders 34, 35 and 36, 37 are attached via brackets to end walls 64 and 66, respectively. Cylinders 34-37 are supplied hydraulic fluid via hydraulic hand pump 41 (see FIG. 2). A pair of slots 29 are provided in each side plate 72 and 74 for securing to tray assembly 28 via threaded fasteners 31. When fasteners 31 are left loose, cylinders 34-37 can raise and lower tray assembly 28. However, a desired position can optionally be locked by tightening bolts 31 and slots 29, thereby securing the relative position of tray assembly 28 relative to support base 30.

As shown in FIG. 1, tray assembly 28 includes a pair of chrome-plated steel cylindrical cross bars 43 and 45 provided respectively along upstream end 20 and downstream end 22. Each divider assembly 70 includes a linear bearing 47 affixed onto divider 71 at the upstream end 20 and a lockable linear bearing 49 provided at a downstream end 22. The upstream position of each divider plate 71 is ensured by way of a respective pivot arm provided on the upstream end of plate 71 which interdigitates with a respective top edge on a baffle 24 of ramp 13. A downstream end of each divider plate 71 is secured into a desirable lateral position by unlocking and locking a respective lockable linear bearing 49 so as to provide a desired and aligned width for each channel, or row 76.

As shown in FIG. 1, side plates 64 and 66 are each constructed from aluminum alloy and a bottom wall 68 is constructed of stainless steel sheet metal which is secured along lateral edges to a bottom surface of side wall 64 and 66 via fasteners. Bars 43 and 45 are secured via threaded internal end bores using individual end fasteners that mate with side wall 64 and 66. The inner surface of each side wall 64 and 66 receives a cam follower guide-type mechanically jointed rodless cylinder 38 and 39, respectively which are each secured using a plurality of threaded fasteners to side wall 64 and 66 while the cylinders 38 and 39 are used to reciprocate shuttle frame 42 between an upstream position and a downstream position. Movement of shuttle 42 causes corresponding movement of individual separator pick assemblies 50 provided within each channel 76, causing separation of continuous stacks of thermoformed articles which are ejected from each channel 76 onto a downstream conveyor 16 (see FIG. 2). Each separator pick assembly 50 is pivotably supported for retraction when shuttle frame 42 is moved rearwardly toward an upstream position such that each separator pick rotates upwardly, through contact, to clear a respective stack of cups that were not separated in a previous downstream shuttle operation.

According to one construction, side plates 72 and 74 are formed from aluminum alloy. Side plates 72 and 74 are secured onto frame 18 where they provide a support base for an adjustably, elevationally supporting tray assembly 28 at desired aligned heights so that bottom wall 68 is presented at a desired elevation for processing and separating of stacks of thermoformed articles, such as cups.

A stop bar 87 is supported by a pair of pneumatic cylinders 85 at each end for raising and lowering of stop bar 87. Additionally, a pivot 89 is provided at each end where cylinders 85 attach to tray assembly 28. Stop bar 87 serves to capture movement of any stray cups. When shuttle 42 is separating and delivering segmented stacks of cups, pneumatic cylinders 85 are raised, elevating stop bar out of the way. However, in the event that cylinders 85 are not properly actuated, pivots 89 enable bar 87 to pivot out of the way as segmented stacks of cups are delivered via shuttle 42 onto an adjacent conveyor table.

According to one construction, pneumatic cylinders 85 are manufactured by SMC Corporation of 3011 North Franklin Road, Indianapolis, Ind. 46226, manufacturer part number NCGWBN20-0300. Gas spring 32 comprises a gas spring/shock manufactured by ACE Controls International Incorporated (in Delaware USA) of Belvedere Road, Newton-le-Willows, Merseyside, UK WA12 0JJ, sold under the name ACE PUL type gas spring, manufacturer part number GZ-19-100-AA-270. According to one construction, hydraulic cylinders 34-37 each comprise a hydraulic cylinder manufactured by Suspa, Inc. of 3970 Roger B. Chaffee Memorial Drive, Grand Rapids, Mich. 49548-3497, sold under the name Movotec CB hydraulic cylinder, manufacturer part number CB415. According to one construction, rodless cylinders 38 and 39 each comprise a cam follower guide type mechanically jointed rodless cylinder manufactured by SMC Corporation of 3011 N. Franklin Road, Indianapolis, Ind. 46226, manufacturer part number MY1C25G-500LS and having a 25 mm. bore and a 500 mm. stroke. According to one construction, hydraulic hand pump 41 is a hydraulic hand pump manufactured by Suspa, Inc., sold under the name Movotec PB Pump 4 cylinder 150 mm. adjustable with small handle, manufacturer part number PB4809FC2. According to one construction, pneumatic cylinder 84 is an SMC pneumatic cylinder having a ¾ inch bore× ½ inch stroke, manufacturer part no. NCME075-0050 from SMC Corporation of 3011 N. Franklin Road, Indianapolis, Ind. 46226.

As shown in FIG. 2, the details of pivots 58 are shown such that each divider assembly 70 mates via pivot arm 58 with a respective baffle 24 on stack guiding apparatus 12. Shuttle frame 42 is shown retracted to an upstream-most position, prior to separating each stack of cups into a new segmented stack for delivery onto conveyor table 16. Hydraulic cylinders 34-37 are in fluid communication via flexible hydraulic fluid lines (not shown) with a hand-cranked hydraulic fluid source 41. Through hand actuation, fluid can be added to or removed from cylinders 34-37 to raise and lower the tray assembly to desired elevational positions.

Figure 3:
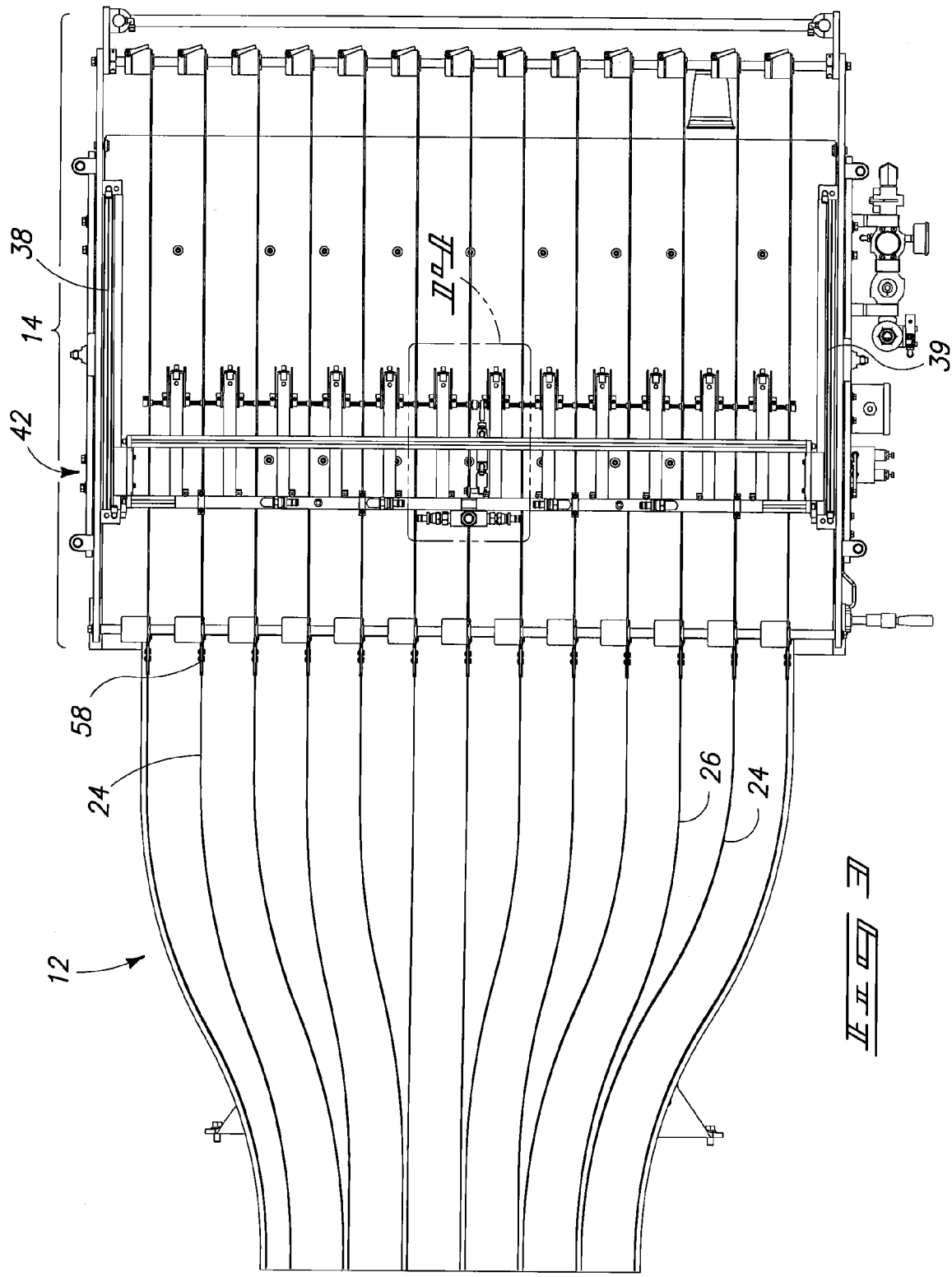
FIG. 3 is a plan view of the stack segmenting apparatus and stack guiding apparatus of FIGS. 1-2.

FIG. 3 further illustrates the orientation of rodless cylinders 38 and 39 on stack segmenting apparatus 14. Likewise, pivot arms 58 are spring-loaded into engagement with a top edge of each of baffle 24 so as to ensure alignment of respective channels on apparatus 14 with channels on apparatus 12 even when baffles 24 change in height. In this manner, an orderly continuous stream of stacked articles, or cups are received from a trim press into guiding apparatus 12 for delivery into segmenting apparatus 14 where the continuous stack of articles is subdivided into segments or segmented stacks for delivery onto a conveyor table.

Figure 4:
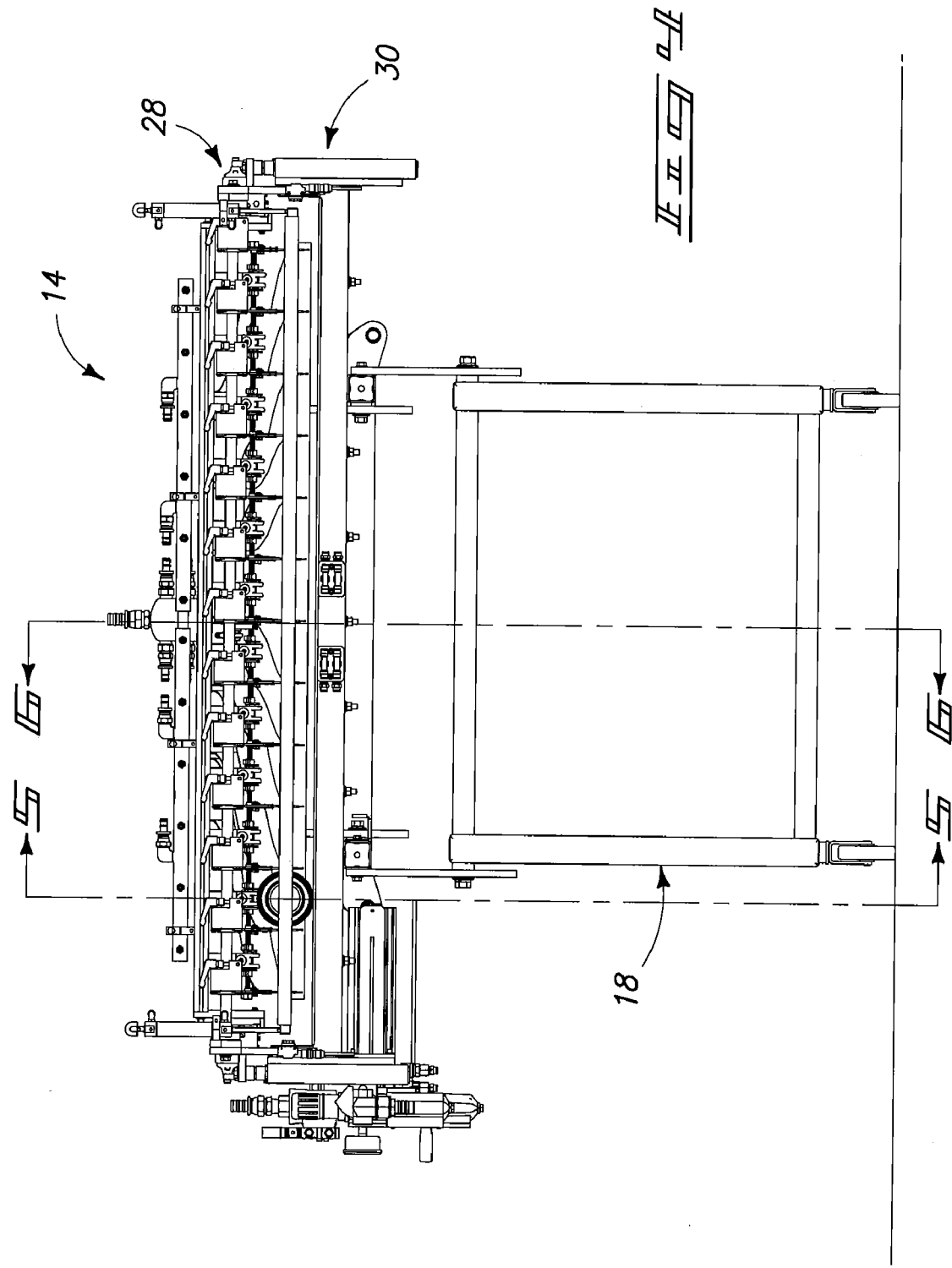
FIG. 4 is an exit end view taken from the right relative to the plan view depicted in FIG. 3.
Figure 5:
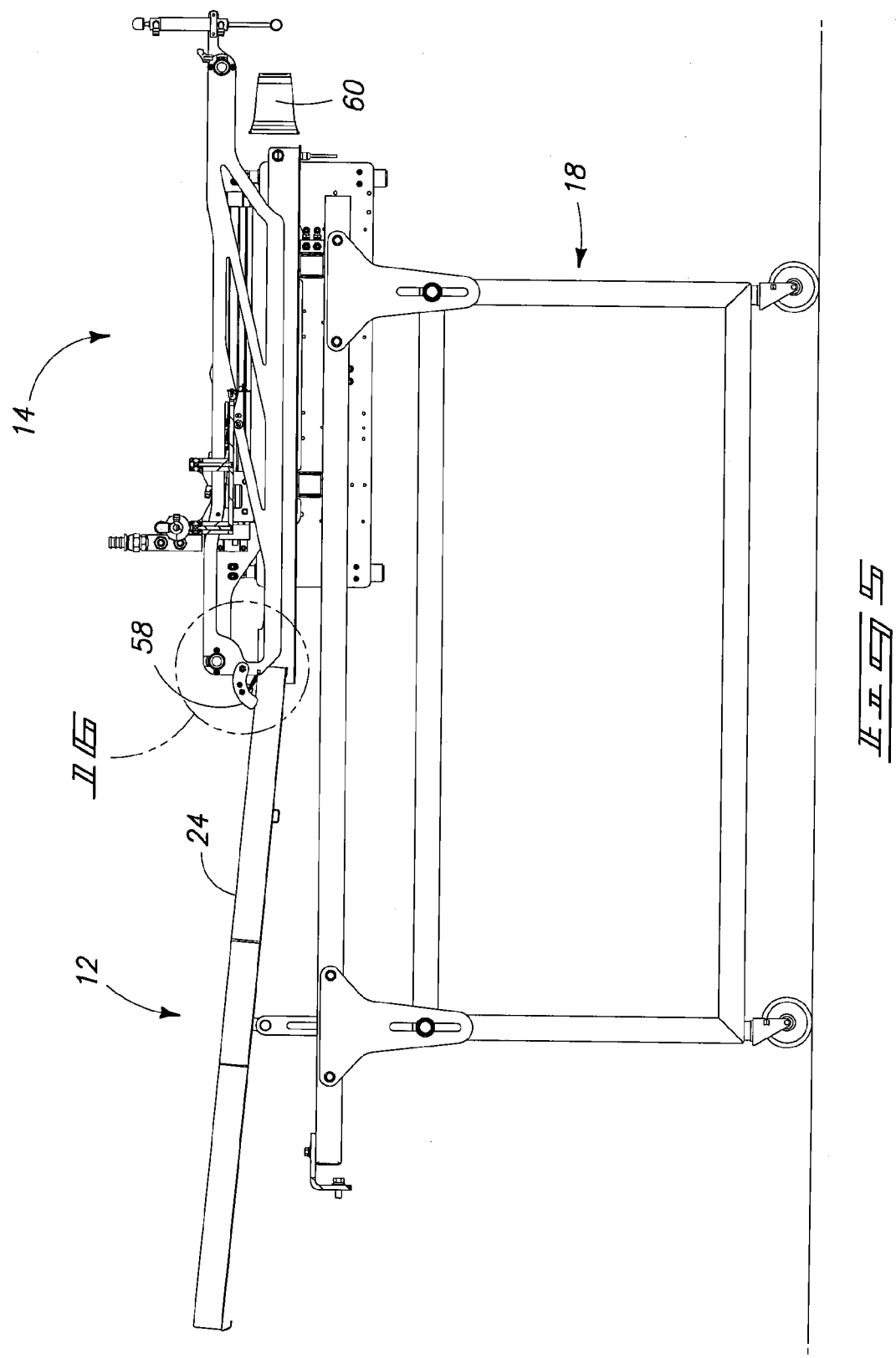
FIG. 5 is a vertical sectional view taken along line 5-5 of FIG. 4.
Figure 6:
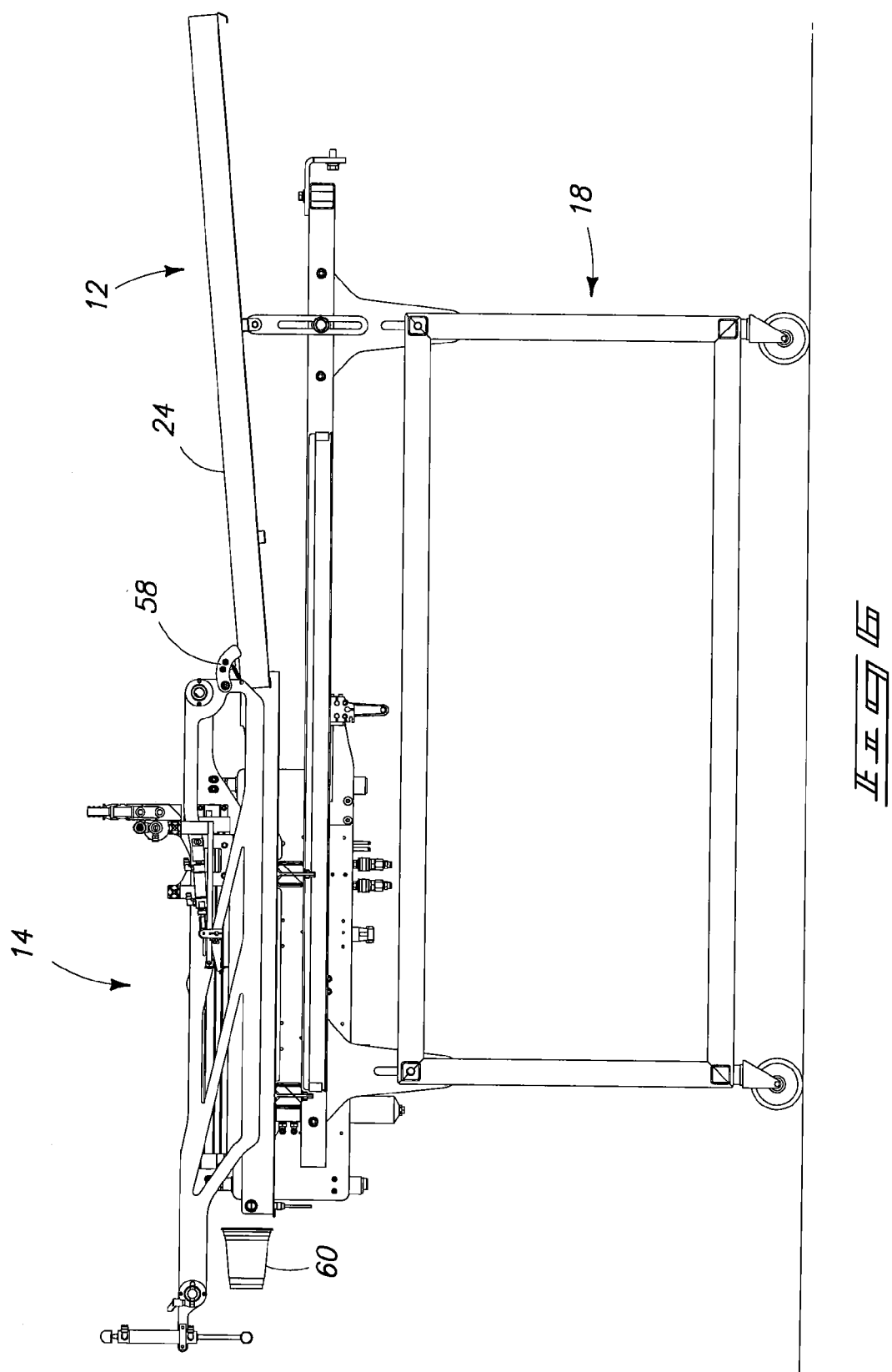
FIG. 6 is a vertical sectional view taken along line 6-6 of FIG. 4.
Figure 7:
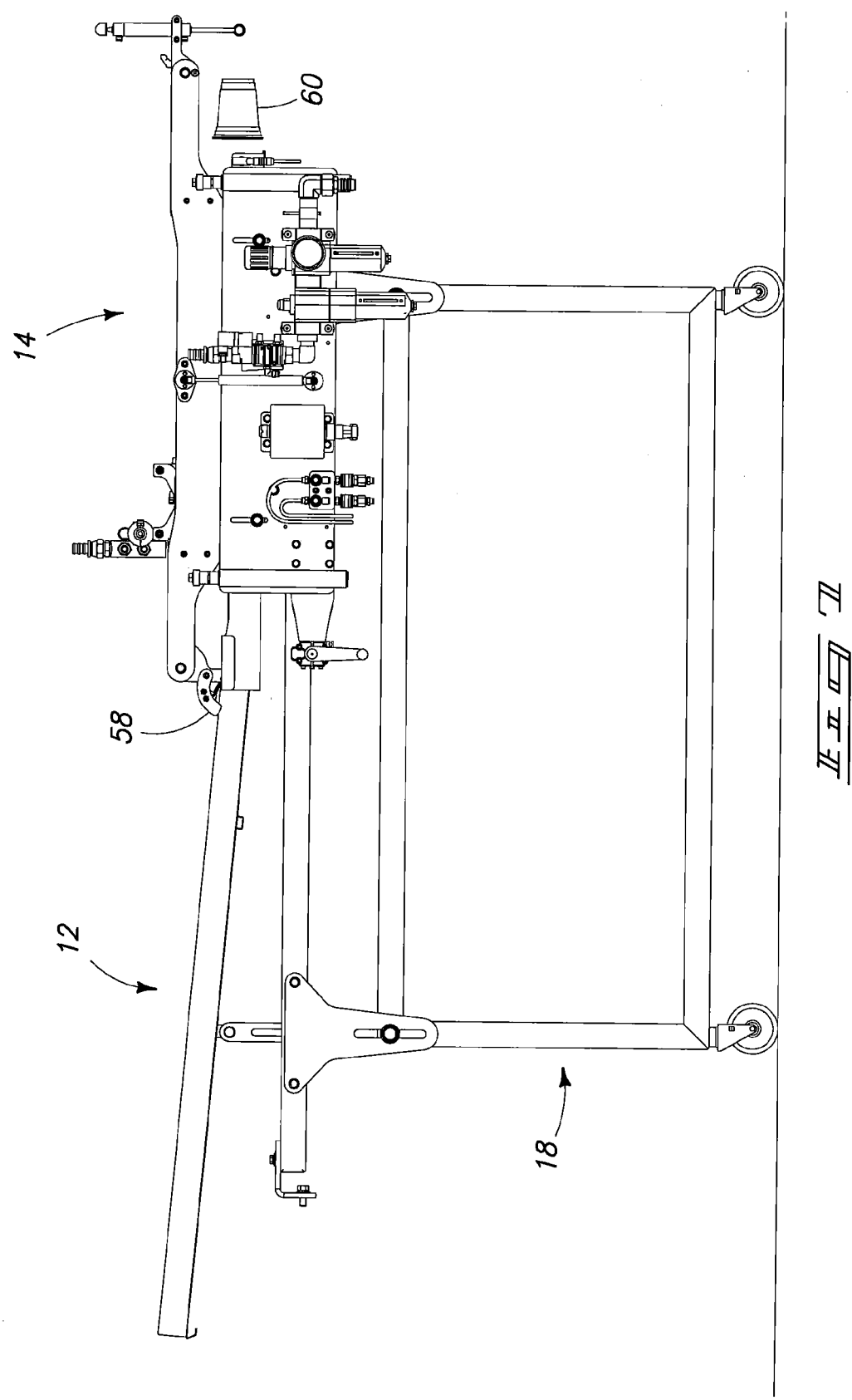
FIG. 7 is a right side view taken from the front relative to the plan view depicted in FIG. 3.

FIG. 4-7 further illustrate the mounting of stack segmenting apparatus 14 and stack guiding apparatus 12 onto a frame 18 which has wheels for facilitating movement during assembly and disassembly. As shown in FIG. 4, tray assembly 28 can be elevationally raised and lowered relative to support base 30 and frame 18 in order to achieve a desired elevation for respective channels in tray assembly 28.

Figure 8:
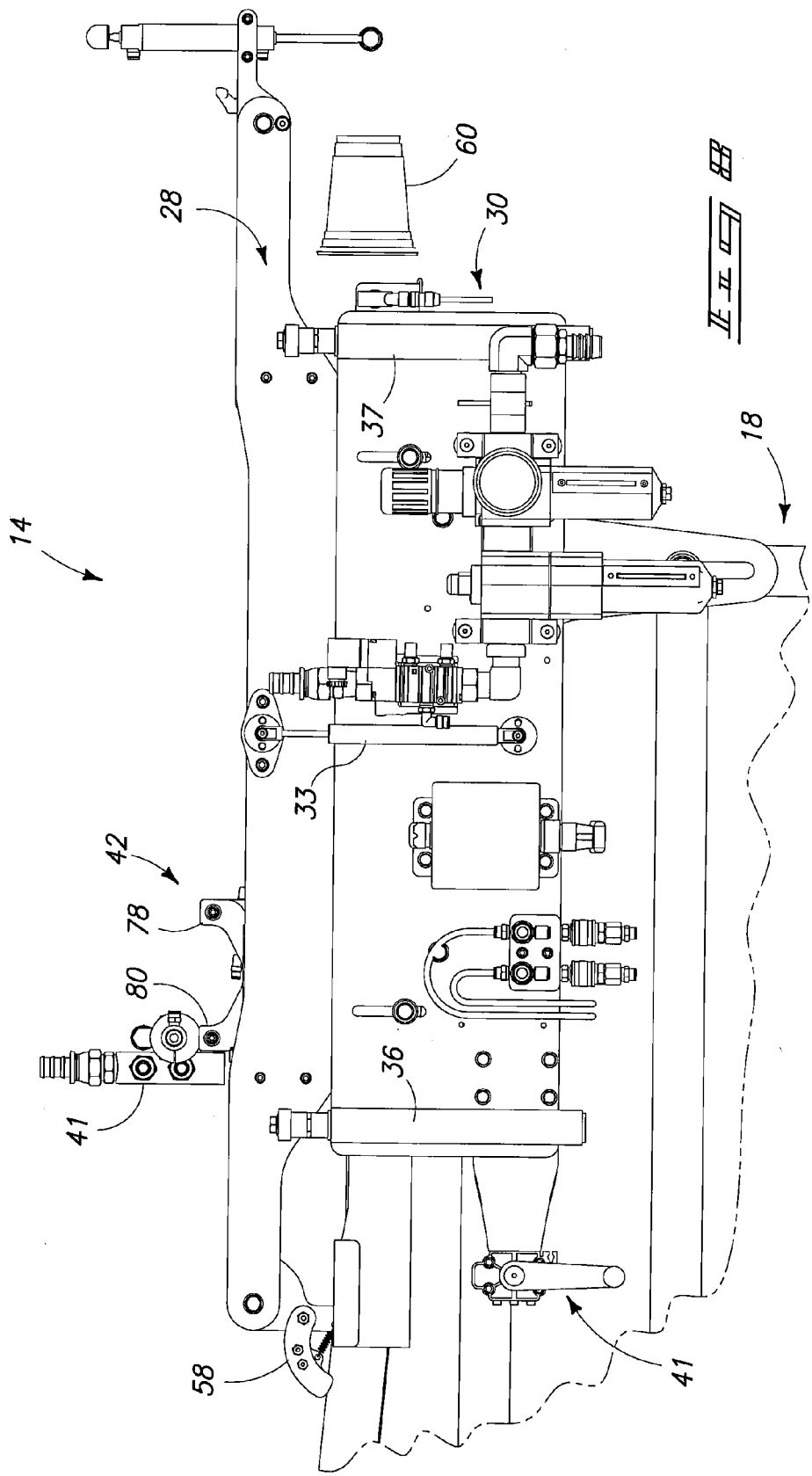
FIG. 8 is an enlarged right side view of the stack segmenting apparatus of FIG. 7.

FIG. 8 illustrates components of stack segmenting apparatus 14 in greater detail. More particularly, shuttle frame 42 of tray assembly 28 is shown retracted to a furthest upstream position. Shuttle frame 42 includes a pair of cross bars 78 and 80. A pneumatic manifold 44 is mounted onto cross member 80. A pneumatic hose (not shown) receives a supply of pneumatic fluid from a source, such as a compressor or a pressurized tank, and manifold 44 distributes pressurized air for release via air jets 52 (see FIGS. 14-15). In operation, a blast of pressurized air is delivered between a leading cup that is not being separated and a downstream stack of cups that is being segmented and separated from the continuous stack of cups by delivering a blast of pressurized air onto the first cup that is not being separated and segmented. A timed blast of air during initial separation tends to rearwardly push the leading cup that is not being segmented due to the frustoconical outer surface of the cup receiving a blast of air thereagainst. In operation, it is understood that a beak rack assembly 54 (see FIG. 9) further ensures that adjacent cups that are not desired to be separated in a segment remain with the continuous upstream stack during a segmenting operation. Further details will be described below with reference to FIGS. 9-13. Support base 30 is shown rigidly affixed atop frame 18 along with hydraulic source 41, as well as hydraulic cylinders 36, 37 (as well as 34, 35) and gas spring 33 (and gas spring 34).

Figure 9:
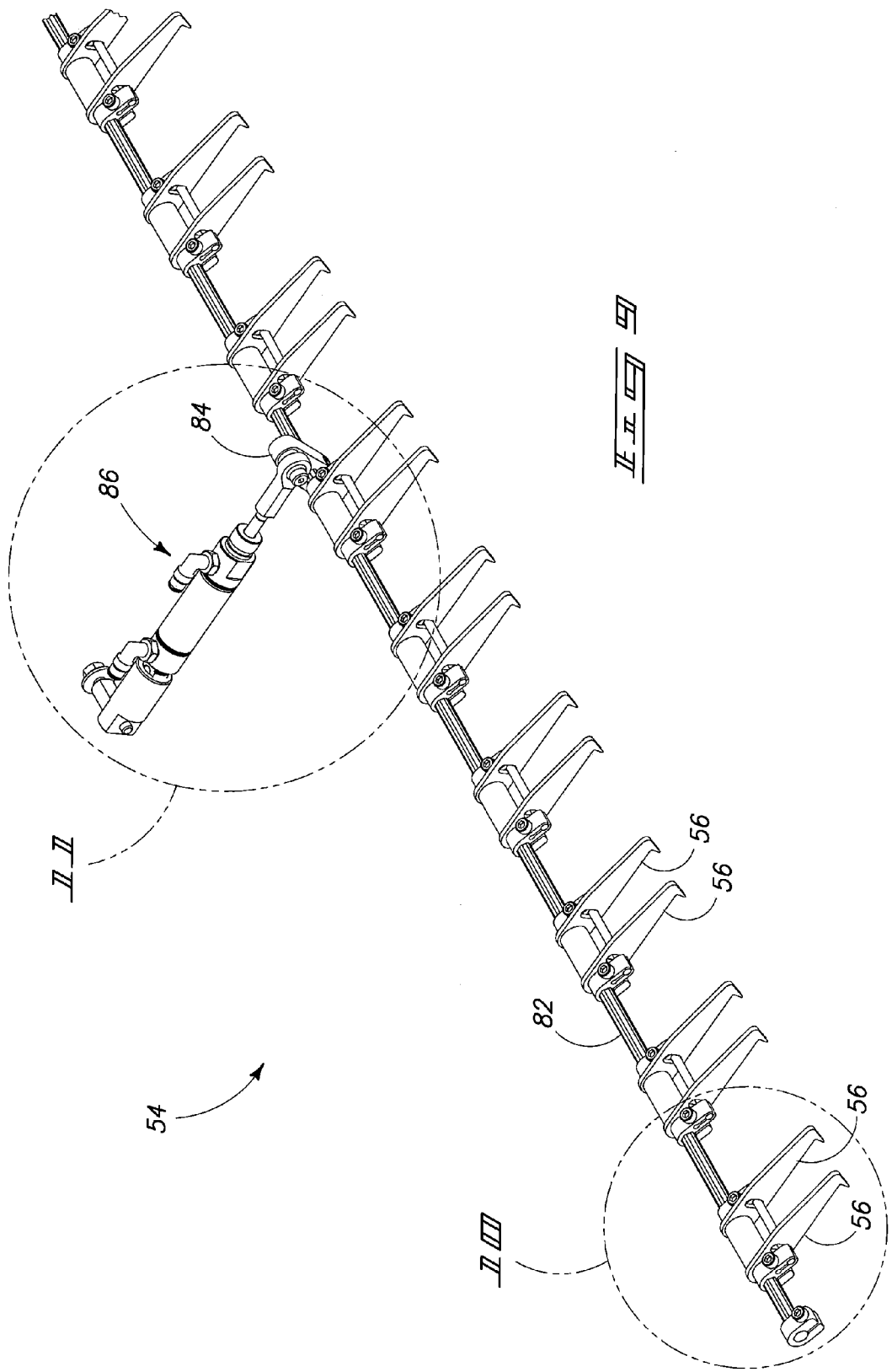
FIG. 9 is an enlarged component assembly perspective view of a beak rack assembly from the stack segmenting apparatus of FIGS. 1-8.

FIG. 9 shows construction details for a beak rack assembly 54 that helps retain rows of stacked cups that are not being separated and segmented from the continuous stacks being delivered from a thermoforming machine. More particularly, beak rack assembly 54 comprises a plurality of individual pairs of beak arms 56 that are aligned for pivotal positioning within respective channels of the tray assembly on the stack segmenting apparatus of FIGS. 1-8. Pairs of beak arms 56 are supported in spaced apart relation along a hexagonal shaft 82 that is pivoted between up and down positions via a crank arm 84 using a pneumatic cylinder 86. Hexagonal shaft 82 is supported within individual bores via a cylindrical bronze bushing 83 supported in each divider plate for each divider assembly 70 (see FIG. 14). Each bushing is sized to receive and support hexagonal shaft 82 for smooth rotation therein.

Figure 10:
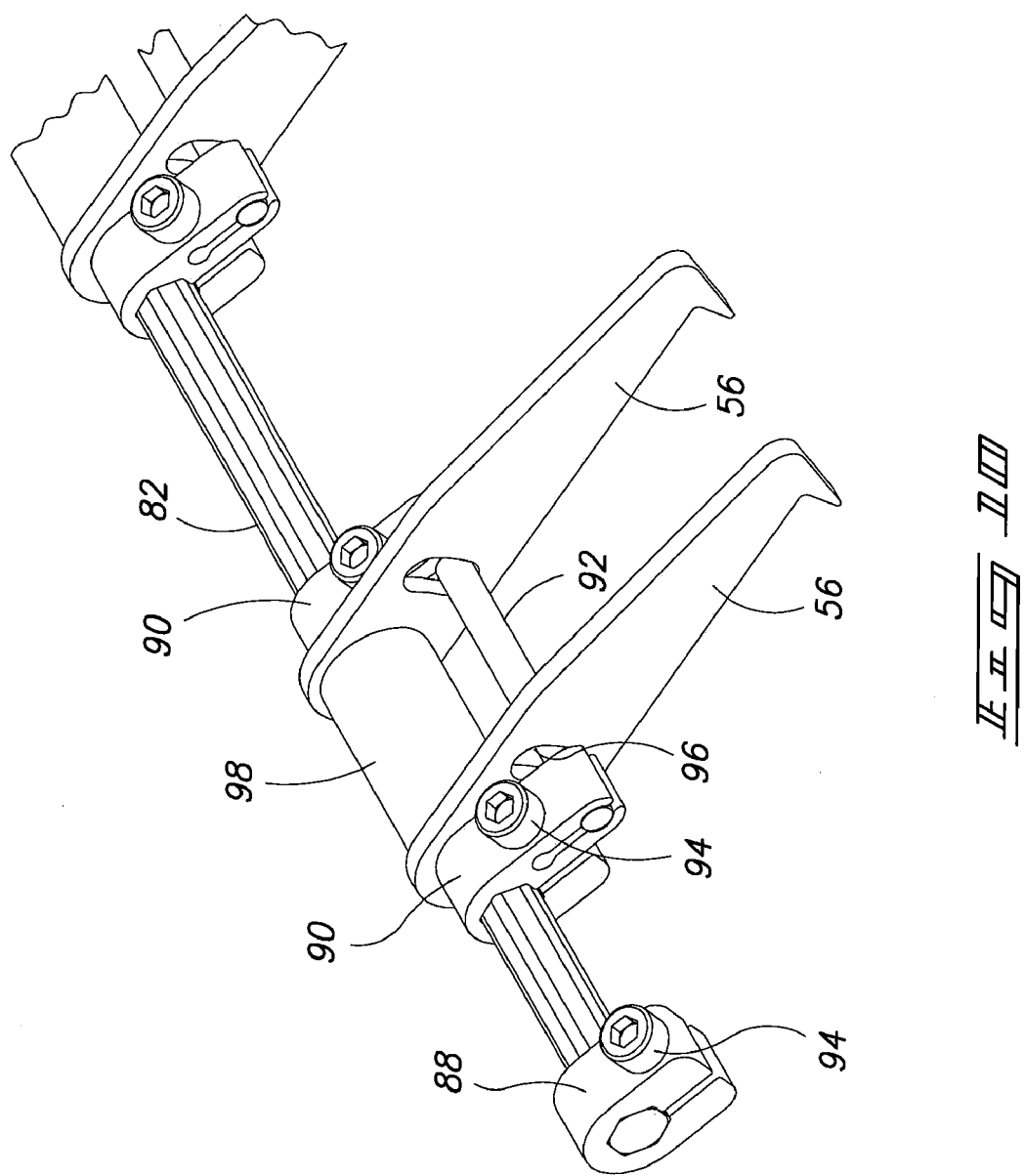
FIG. 10 is a further enlarged partial component view, in breakaway, of one pair of beaks for the beak rack assembly taken from the encircled region 10 of FIG. 9.
Figure 11:
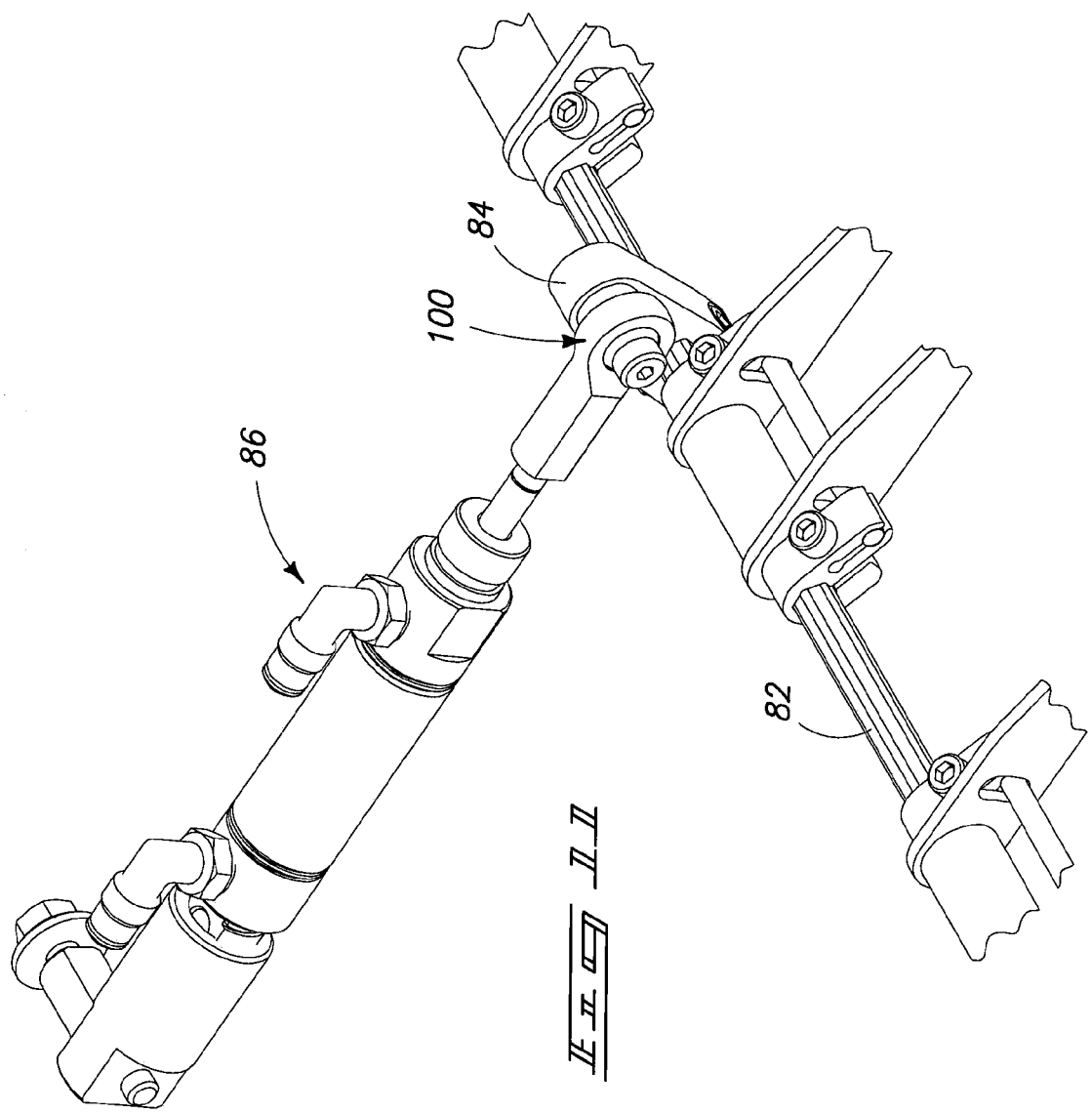
FIG. 11 is a further enlarged partial component view, in breakaway, of the actuator assembly for the beak rack assembly taken from the encircled region 11 of FIG. 9.

FIG. 10 illustrates in greater detail the construction of one pair of beak arms 56. More particularly, a pair of crank arms 90 are rigidly clamped onto shaft 82 using individual threaded fasteners 94. Crank arms 90 have a complementary hexagonal clamp surface. A cylindrical spacer tube 98 holds beak arms 56 at a desired spaced apart orientation between crank arms 90. Crank arms 90 also support a drive pin 92. Drive pin 92 articulates within a respective slot 96 in each beak arm 56. In this manner, beak arms 56 are not rigidly affixed onto shaft 82, but provide some rotational "give" so that shaft 82 does not necessarily need to be precisely oriented between raised and lowered positions when gripping cups and releasing cups in a continuous stack. Each end of shaft 82 extends through sidewall 64 and sidewall 66 where it is retained using an end clamp 88 and fastener 94 placed outside the respective sidewall 64 and 66.

FIG. 9 illustrates in greater detail the construction of pneumatic cylinder 86 having a ball joint rod end 100 that rotatably couples with a radial outer end of crank arm 84 to pivot drive shaft 84 when raising and lowering beak arms 56 to release and capture continuous stacks of cups provided upstream of beak arms 56.

FIGS. 12 and 13 show a retracted position for a pneumatic cylinder 86 of beak rack assembly 54. When retracted, pneumatic cylinder 86 pulls back crank arm 84, raising beak arms 56 when pin 92 engages of the top edge of arcuate slot 96. FIG. 12 illustrates extension of actuator 86 so as to drive crank arm 84 forward when lowering beak arms 56.

FIG. 13 shows pneumatic cylinder 86 in an extended position, wherein crank arm 84 is driven forward so as to lower beak arms 56 into engagement with an un-rolled lip edge on a cup 60 within a continuous stack of cups 62. Those cups downstream of cup 60 (that is engaged with beak arms 56) will be delivered in a segment using the separator pick assembly 50 (of FIG. 14). Those cups upstream of beak arm 56 are retained by beak rack assembly 54 and prevented from moving downstream.

FIG. 14 illustrates separator pick assembly 50 at a further upstream location prior to moving a segment of cups in a downstream direction, separating them from a continuous stream of cups being delivered in a channel from a thermoforming trim press. Pick plate 51 is shown between a pair of beak arms 56.

Pick plate 51 is formed from a single piece of stamped steel that is secured with a threaded fastener 59 and a washer 60 into an aluminum pivot bracket 53. Bracket 53 is supported for pivotal engagement within a recess 67 on a downstream end of a longitudinal support bar 46 by way of a pivot pin 63. Slot 65 has a square back surface and pivot bracket 53 has a mating square lowered surface that engages to form a stop 67 that prevents pick plate 51 from rotating more than 90 degrees out of plane from longitudinal support bar 46. However, pick plate 51 can pivot upwardly which is necessary when moving pick plate 51 from a downstream position toward an upstream position as pick plate 51 needs to clear top lip edges of individual cups in a stack of cups.

As shown in FIG. 14, individual air jet assemblies 52 are threaded into a through bore 77 in each longitudinal support bar 46. Air jet 52 is coupled through a flexible pneumatic hose (not shown) with pneumatic manifold 44. Air is supplied from a pressurized air source through manifold 44, flexible pneumatic tubes (not shown), and air jet 52 to downwardly deliver a blast of air between an upstream cup and a downstream cup being separated during the transfer of a segment of stacked cups in a downstream direction. The blast of air acts on the last cup not being segmented and moved, causing the cup to move upwardly into stacked engagement with the remaining stack of cups that are not being transferred and segmented. Meanwhile, continuous stacks of cups are adjoined as a trim press trims more cups into each stack. In this manner, a tendency to leave stray cups in a respective channel is reduced or eliminated. The articulation and action of beak arms 56 further facilitate retention of the upstream cups which further prevents stray cups from dislodging during the separation and segment operation of stacks of cups.

Each longitudinal support bar 46 is mounted beneath cross bars 78 and 80 using tapped and threaded cylindrical stands or bosses 81. Threaded fasteners (not shown) engage within opposite ends of each boss 81 to join bar 46 onto a respective one of cross bars 78 and 80. Optionally, cross bar 78, 80, stand 81 and bar 46 can be welded together. Furthermore, cross bars 78 and 80 are secured to respective end plates with fasteners. Such end plates are then secured onto moving plates provided within each rodless cylinder using threaded fasteners. As shown in FIGS. 18-20 a top fastener in each stand 81 locks within a receiving groove of each cross bar 78 and 80, whereas a bottom fastener is received up through a bore in bar 46 (not shown) and into a threaded bore within stand 81.

FIG. 15 illustrates in greater detail the orientation of pneumatic cylinder 86. Pneumatic cylinder 86 mounts through a bore (not shown) provided in a complementary divider plate 71 (see FIG. 14) using a threaded fastener. Pneumatic cylinder 86 is pivotably affixed at an upstream end to raise and lower beak arms 56. Each beak arm 56 terminates in a sharp finger 69. Likewise, each pick plate 51 terminates in downwardly extending pair of fingers 73 and a perpendicular ledge 75. Ledge 75 prevents cups that have engaged with finger 73 from riding in an upward direction during transport in a downstream direction. It is understood that shuttle frame 42 (see FIGS. 1-2) moves longitudinal support bars 46 and separator pick assemblies 50 between upstream and downstream locations during a separation and cup segmenting operation. At the same time, beak arms 56 remain in a single location, but merely rotate between upward and downward pivotal positions to release and engage, respectively, unformed lip edges of cups that are not being separated and segmented until a subsequent cycle operation.

FIG. 16 illustrates construction details of pivot arm 58. More particularly, a pair of metal plates 106, 107 are secured together with a pair of fasteners. A groove 110 is formed between plates 106 and 107 such that pivot arm 58 is lodged over a top edge of baffle 24 via groove 110. A stretched coil spring 108 pivotally retains pivot arm 58 securely atop baffle 24 via slot 110. Pivot arm 58 pivots about a pivot fastener 110 that is provided through a respective divider plate 71.

FIG. 17 illustrates beak rack assembly 54 engaged with a lip edge on a cup to prevent all cups upstream of the beak arms on the beak rack assembly from being separated and moved while moving a stack segment in a downstream direction. Meanwhile, shuttle frame 52 is moved from an upstream position identified by reference numeral 42 to a downstream direction identified by reference numeral 42'. Each pick plate 51 is moved from a corresponding upstream position identified by reference numeral 51 to a downstream position identified by reference numeral 51'. Accordingly, separator pick assembly 50 moves between such upstream and downstream positions. In this manner, beak rack assembly 54 prevents movement of any cups in a continuous stack of cups originating from a thermoforming trim press from being separated with the cups that are being separated and segmented via movement of pick plate 51 in a downstream direction.

After a segmented stack of cups has been moved in a downstream direction, shuttle frame 42 is moved back to an upstream position, causing each pick plate 51 to pivot upwardly as a rear surface of the pick plate 51 engages on the lip edges of cups until reaching an upstream location. Forward movement of each pick plate 51 causes pick plate to rotate downwardly and engage with a new lip edge so as to initiate separation and segmentation of a new stack of cups in a subsequent cycle operation. Between such cycles, beak arms 56 are raised until it becomes necessary to engage with a new lip edge just before pick plates are engaged to generate a new segmented stack of cups for movement in a downstream direction.

FIGS. 18-20 illustrate sequential steps in separating a segment of stacked cups and moving the segment of stocked cups in a downstream direction. More particularly, FIG. 18 illustrates movement of shuttle frame 42 in an upstream direction, causing pick plates 51 to rotate upwardly and bounce along the lip edges of individual cups 16 in a continuous stack of cups 62. Beak arms 56 are rotated to a raised position so that the stack of cups 62 can be fed in a downstream direction resulting from a trim press driving a stack of cups in a downstream direction as they are trimmed from a web of thermoformed material.

FIG. 19 illustrates the beginning of a separation cycle, wherein beak arms 56 are lowered via pneumatic cylinder 86 while shuttle frame 42 is in an upstream location, placing pick plates 51 at a coincident location with beak arms 56. Beak arms 56 are lowered to prevent movement of cups upstream of this location while pick plate 51 is lowered to move all cups downstream of this location to generate a new segment of stacked articles for movement downstream and outwardly to a conveyor table.

FIG. 20 illustrates beak arms 56 engaged to retain all cups upstream of the separation location, while pick plate 51 locks in a 90 degree orientation relative to the direction of travel so as to move a segment of stacked cups 60 in a downstream direction for delivery onto a conveyor table.

It is understood that the structural components of stack segmenting apparatus 14 can be constructed from any of a number of suitable materials, such as metals, including steel, aluminum alloy, and stainless steel.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A thermoformed article stack segmenting apparatus, comprising:
   a frame;
   a stacked article guide channel carried by the frame, generally horizontally extending, and configured to receive and guide a stack of inter-nested articles exiting a female die of a thermoforming trim press;
   a forward engaging drive finger;
   a drive finger actuator coupled with the drive finger to drive the finger forward in engagement with one separated stack of articles and to drive the finger rearward in a retractable state to separate another, successive stack of articles;
   a rearward engaging holding finger pivotally supported by the frame and having an arm with an arcuate slot; and
   a holding finger actuator coupled with the holding finger and having a drive pin extending through the arcuate slot in the arm, the holding finger actuated by the holding finger actuator between raised and lowered positions, the holding finger supported in elevationally floating relation at the lowered position to provide limited rotational decoupling of the arm relative to the pin and configured to hold the another, successive stack of articles while driving the forward engaging drive finger forward;
   wherein the rearward engaging holding finger is provided by a distal end of a beak arm pivotally supported on a drive shaft with limited pivotal decoupling provided between the arcuate slot on the drive finger and the drive pin is rigidly mounted to the shaft to provide limited rotational decoupling of the beak arm relative to the shaft.

2. The thermoformed article stack segmenting apparatus of claim 1, wherein an array of juxtaposed stacked article guide channels are carried by the frame each configured to received a respective stack of inter-nested articles exiting females dies of a thermoforming trim press.

3. The thermoformed article stack segmenting apparatus of claim 2, wherein the array of juxtaposed stacked article guide channels are transversely spaced.

4. The thermoformed article stack segmenting apparatus of claim 1, wherein the drive finger comprises a pick plate pivotally carried relative to the drive finger actuator.

5. The thermoformed article stack segmenting apparatus of claim 4, wherein the pick plate comprises a pair of drive fingers and a retention ledge extending perpendicular to the drive fingers configured to retain articles from upward lifting during transport.

6. The thermoformed article stack segmenting apparatus of claim 4, wherein the pick plate engages an article in the forward direction and pivotally retracts upwardly in a rearward direction to pass over the articles.

7. The thermoformed article stack segmenting apparatus of claim 1, wherein a pair of the beak arms are provided in laterally spaced apart relation on the shaft to jointly hold the another successive stack of articles while driving the forward engaging drive finger forward.

8. The thermoformed article stack segmenting apparatus of claim 1, wherein the drive finger actuator is provided by a shuttle frame coupled to a pair of rodless cylinders that move the shuttle frame forward and rearward relative to the frame.

9. The thermoformed article stack segmenting apparatus of claim 8, wherein the drive finger is affixed to a support bar of the shuttle frame.

10. A thermoformed article transfer apparatus, comprising:
    a frame;
    an array of stacked article guide channels carried by the frame, transversely spaced and generally horizontally extending, each configured to receive and guide a stack of inter-nested articles exiting a female die of a thermoforming trim press;
    a drive finger provided relative to each channel;
    a drive finger actuator coupled with each of the drive fingers to move the drive finger forward in engagement with one stack of articles and to move the drive finger rearward in a retractable state to separate another, successive stack of articles within the channel;
    a rearward engaging holding finger provided relative to each channel;
    a drive shaft supported by the frame;
    an arm pivotally supported on the drive shaft having limited pivotal decoupling between the arm and the shaft, the rearward engaging holding finger provided on a distal end of the arm; and
    a holding finger actuator coupled with each of the holding fingers, each of the holding fingers supported by the frame and actuated by the holding finger actuator between raised and lowered positions, each holding finger supported in limited floating relationship at the lowered position relative to the holding finger actuator and configured to hold the another, successive stack while driving the forward engaging drive finger forward;
    wherein an arcuate slot is provided on the arm and a drive pin extending through the slot is rigidly mounted relative to the shaft to provide limited rotational decoupling of the arm relative to the shaft.

11. The thermoformed article transfer apparatus of claim 10, wherein the drive finger is pivotally supported for engagement with the one stack of articles when moved forward by the drive finger actuator, and is further pivotally supported for raised retraction to pass over the another stack of articles when moved rearward by the drive finger actuator.

12. The thermoformed article transfer apparatus of claim 10 wherein the rearward engaging holding finger is a beak provided on a distal end of the arm.

13. The thermoformed article transfer apparatus of claim 10, wherein each of the holding fingers is supported in limited floating relationship between the lowered position and the raised position relative to the holding finger actuator.

14. The thermoformed article transfer apparatus of claim 10, wherein the drive finger actuator is provided by a shuttle frame coupled to a pair of extensible/retractable cylinders that move the shuttle frame forward and rearward relative to the frame.

15. The thermoformed article transfer apparatus of claim 14, wherein each extensible/retractable cylinder comprises a rodless cylinder affixed to opposed sidewalls of the frame.

16. The thermoformed article transfer apparatus of claim 10, further comprising a pneumatic jet supported to direct pneumatic fluid between the drive finger and the holding finger and fluid coupled with a source of pneumatic fluid to separate a downstream terminal article in the one stack from an upstream terminal article in the another stack while being separated.

17. A thermoformed article transfer apparatus, comprising:
a frame;
an array of stacked article guide channels carried by the frame, transversely spaced and generally horizontally extending, each configured to receive and guide a stack of inter-nested articles exiting a female die of a thermoforming trim press;
a drive finger provided relative to each channel;
a drive finger actuator coupled with each of the drive fingers to move the drive finger forward in engagement with one stack of articles and to move the drive finger rearward in a retractable state to separate another, successive stack of articles within the channel;
a rearward engaging holding finger provided relative to each channel; and
a holding finger actuator coupled with each of the holding fingers, each of the holding fingers supported by the frame and actuated by the holding finger actuator between raised and lowered positions, each holding finger supported in limited floating relationship at the lowered position relative to the holding finger actuator and configured to hold the another, successive stack while driving the forward engaging drive finger forward;
wherein the holding finger actuator comprises a pair of laterally spaced-apart arms joined together with a spacer tube, each arm having an arcuate slot, and a pair of crank arms secured to a drive shaft supporting a drive pin there between and extending through the arcuate slot in each arm.

18. The thermoformed article transfer apparatus of claim 17, wherein the drive shaft is a hexagonal shaft, and the pair of crank arms are rigidly affixed to the hexagonal shaft.

19. The thermoformed article transfer apparatus of claim 17, further comprising a crank arm affixed to the hexagonal shaft and a pneumatic cylinder mounted to the crank arm to pivot the hexagonal shaft to raise and lower the pair of crank arms and the drive pin so as to raise and lower the holding finger through the respective arcuate slots.

\* \* \* \* \*

UNITED STATES PATENT AND TRADEMARK OFFICE
CERTIFICATE OF CORRECTION

PATENT NO. : 8,337,138 B2  Page 1 of 1
APPLICATION NO. : 12/257253
DATED : December 25, 2012
INVENTOR(S) : Jere F. Irwin It is certified that error appears in the above-identified patent and that said Letters Patent is hereby corrected as shown below:

In the Specification

Column 8, line 67 – Replace "stocked cups" with --stacked cups--

In the Claims

Column 10, line 6 – Replace "to received" with --to receive--

Signed and Sealed this
Thirty-first Day of December, 2013

Margaret A. Focarino
*Commissioner for Patents of the United States Patent and Trademark Office*